US012683381B2

(12) United States Patent
Chen et al.

(10) Patent No.: US 12,683,381 B2
(45) Date of Patent: Jul. 14, 2026

(54) SOLID STATE BREAKER AND POWER SUPPLY SYSTEM

(71) Applicant: Schneider Electric (China) Co., Ltd., Beijing (CN)

(72) Inventors: Jiamin Chen, Shanghai (CN); Ying Shi, Shanghai (CN); Simon Tian, Shanghai (CN); Fenglian Zhang, Shanghai (CN); Haijun Zhao, Shanghai (CN); Feng Lu, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 172 days.

(21) Appl. No.: 18/432,741

(22) Filed: Feb. 5, 2024

(65) Prior Publication Data

US 2025/0233585 A1 Jul. 17, 2025

(30) Foreign Application Priority Data

Jan. 15, 2024 (CN) .......................... 202410058153.5

(51) Int. Cl.
*H02H 3/32* (2006.01)
*H02J 1/00* (2006.01)

(52) U.S. Cl.
CPC .............. *H02H 3/325* (2013.01); *H02H 3/32* (2013.01); *H02J 1/00* (2013.01)

(58) Field of Classification Search
CPC ...... H02H 3/00–52; H02H 3/32; H02H 3/325; H02J 7/00–977
See application file for complete search history.

(56) References Cited

U.S. PATENT DOCUMENTS

2021/0074490 A1 3/2021 Askan et al.
2022/0166206 A1 5/2022 Beckert et al.
(Continued)

FOREIGN PATENT DOCUMENTS

| CN | 114400612 A | 4/2022 | |
| DE | 102022002622 A1 * | 9/2022 | ............... B60L 3/04 |
| WO | 2023280730 A1 | 1/2023 | |

OTHER PUBLICATIONS

Translation of DE 102022002622 A1. Sep. 1, 2022. (Year: 2022).*
(Continued)

*Primary Examiner* — Thienvu V Tran
*Assistant Examiner* — Christopher J Clark
(74) *Attorney, Agent, or Firm* — Quinn IP Law

(57) ABSTRACT

The present disclosure provides a solid state breaker and a power supply system. The breaker includes: a first port and a second port configured to connect a first external system; a third port and a fourth port configured to connect a second external system; a first electronic switch connected between the first port and the third port; a second electronic switch connected between the second port and the fourth port; and a control unit configured to control the first electronic switch and the second electronic switch to be turned off in a case of detecting an electricity leakage occurs in the second external system. The breaker is provided with electronic switches at both poles, so that it can provide effective protection for the human body by quickly turning off the electronic switches provided at both poles, in a case of an electricity leakage of the prosumer to the ground.

20 Claims, 2 Drawing Sheets

(56)            References Cited

U.S. PATENT DOCUMENTS

2023/0137013 A1*  5/2023  Telefus .................. H02M 1/08
                                                  361/93.1
2024/0305086 A1*  9/2024  Yang ..................... H02H 9/043
2025/0062608 A1*  2/2025  Wang .................... H02H 3/087

OTHER PUBLICATIONS

Extended European Search Report dated Sep. 17, 2024 for corresponding European Patent Application No. 24155440.1-1002, 8 pages.

* cited by examiner

SOLID STATE BREAKER AND POWER SUPPLY SYSTEM

TECHNICAL FIELD

The present disclosure relates to a field of a switch, and more particularly relates to a solid state breaker and a power supply system.

BACKGROUND

Different from a traditional distribution network, there are a large number of distributed power sources or power prosumers in a DC microgrid. The prosumer may realize bidirectional transformation, such as sometimes acting as a source and sometimes acting as a load. The prosumer may be, for example, a Vehicle-to-Grid (V2G) charging pile.

The existence of the above-mentioned multiple sources in the DC microgrid will bring the complexity of a distribution system. For example, a power supply that generates a ground fault current can come from a superior power supply or from a prosumer, so it is necessary for an existing Residual Current Device (RCD) and/or a Ground Fault Protection (GFP) product to realize bidirectional protection.

The current solid state breaker can quickly cut off the fault, thereby providing very good protection. However, the cost of solid state devices of the breaker is very high. In order to save the cost, some protection functions cannot be provided. For example, in a TN-S system, a traditional unipolar solid state breaker can't provide timely protection if the prosumer leaks current to the ground.

Therefore, a new solid state breaker is needed.

SUMMARY

In view of the above problems, the present disclosure provides a new solid state breaker. Since the breaker provided by the present disclosure is provided with electronic switches at both poles, it can provide effective protection for a human body and the like by quickly turning off the electronic switches provided at the above both poles, in a case of an electricity leakage of the prosumer to the ground, for example.

Embodiments of the present disclosure provide a solid-state breaker, including: a first port and a second port configured to connect a first external system; a third port and a fourth port configured to connect a second external system; a first electronic switch connected between the first port and the third port; a second electronic switch connected between the second port and the fourth port; and a control unit configured to control the first electronic switch and the second electronic switch to be turned off in a case of detecting that an electricity leakage occurs in the second external system.

According to embodiments of the present disclosure, the solid state breaker further includes: a first voltage stabilizing unit connected in parallel with the first electronic switch, configured to stabilize a voltage of the first electronic switch within a predetermined range.

According to embodiments of the present disclosure, wherein, the first voltage stabilizing unit is a first bidirectional voltage stabilizing diode, one end of the first bidirectional voltage stabilizing diode being connected with a first end of the first electronic switch, and another end of the first bidirectional voltage stabilizing diode being connected with a second end of the first electronic switch.

According to embodiments of the present disclosure, the solid state breaker further includes: a second voltage stabilizing unit connected in parallel with the second electronic switch, configured to stabilize a voltage of the second electronic switch within a predetermined range.

According to embodiments of the present disclosure, wherein, the second voltage stabilizing unit is a second bidirectional voltage stabilizing diode, one end of the second bidirectional voltage stabilizing diode being connected with a first end of the second electronic switch, and another end of the second bidirectional voltage stabilizing diode being connected with a second end of the second electronic switch.

According to embodiments of the present disclosure, the solid state breaker further includes: a current regulating unit connected between the first port and the first electronic switch, configured to making current variation of a current passing through the first electronic switch meet a predetermined condition.

According to embodiments of the present disclosure, wherein, the current regulating unit includes an inductor.

According to embodiments of the present disclosure, the solid state breaker further includes: a first mechanical switch connected between the first port and the first electronic switch.

According to embodiments of the present disclosure, the solid state breaker further includes: a second mechanical switch connected between the second port and the second electronic switch.

According to embodiments of the present disclosure, wherein, the first electronic switch and/or the second electronic switch is an electronic switch based on a metal oxide semiconductor.

Embodiments of the present disclosure provide a power supply system including: the solid state breaker as described above; a power supply connected, as the first external system, with the first port and the second port of the solid state breaker; and a power prosumer system connected, as the second external system, with the third port and the fourth port of the solid state breaker, the power prosumer system having power consumption capacity and power generation capacity.

Embodiments of the present disclosure provide a solid state breaker and a power supply system. Since the breaker provided by the present disclosure is provided with electronic switches at both poles, it can provide effective protection for a human body and the like by quickly turning off the electronic switches provided at the above both poles, in a case of the electricity leakage of the prosumer to the ground, for example. In addition, the solid state breaker provided by the present disclosure is provided with two bidirectional voltage stabilizing diodes to avoid problems such as false closing and damage of the solid state breaker caused by excessive voltage of the electronic switch due to some abnormal situations. In addition, the solid state breaker provided by the present disclosure can also avoid, by setting the inductor, the occurrence that it is too late to deal with the electricity leakage situation due to the current variation being too fast. Moreover, the solid state breaker provided by the present disclosure can also facilitate the daily maintenance of the solid state breaker by setting two mechanical switches.

BRIEF DESCRIPTION OF DRAWINGS

In order to explain technical schemes of embodiments of the present disclosure more clearly, the drawings needed in the description of the embodiment will be briefly introduced below. Obviously, the drawings in the following description are only some exemplary embodiments of the present disclosure, and other drawings can be obtained according to these drawings without creative work for those skilled in the art.

DETAILED DESCRIPTION

Figure 1:
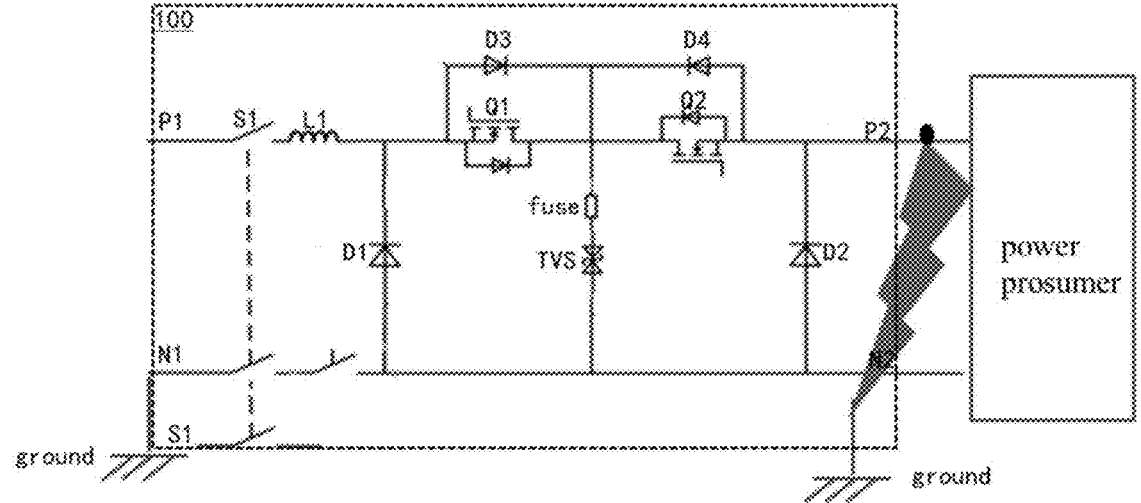
FIG. 1 shows a schematic diagram of a conventional solid state breaker 100.

In order to make the objects, technical solutions and advantages of the present disclosure more obvious, exemplary embodiments according to the present disclosure will be described in detail below with reference to the drawings. Obviously, the described embodiments are only a part of the embodiments of the present disclosure, not all the embodiments of the present disclosure, and it should be understood that the present disclosure is not limited by the example embodiments described here.

In this specification and the drawings, basically the same or similar steps and elements are denoted by the same or similar reference numerals, and repeated descriptions of these steps and elements will be omitted. Meanwhile, in the description of the present disclosure, the terms "first", "second" and so on are only used to distinguish descriptions, and cannot be understood as indicating or implying relative importance or ranking.

FIG. 1 shows a schematic diagram of a conventional solid state breaker 100. As shown in FIG. 1, the conventional solid state breaker 100 includes two ports (P1 and N1) for connecting with an external power supply, two mechanical switches S1, an inductor L1, four diodes (D1, D2, D3 and D4), a bidirectional voltage stabilizing diode TVS, two electronic switches (Q1 and Q2) and two ports (P2 and N2) for connecting with a power prosumer. When an electricity leakage point is between the output of the solid state breaker 100 and the input of the prosumer (the point as shown by a black circle in the figure, and the electricity leakage is shown with a lightning symbol), the conventional solid state breaker can quickly turn off the two electronic switches Q1 and Q2 on that line where P1 and P2 are located (hereinafter referred to as a P line for short) to avoid the harm of external power supply to a human body, for example. However, because the prosumer can be used as a power supply, the current from the prosumer can still form a loop through the electricity leakage point, ground, N1 and N2, which will still do harm to the human body, for example.

It can be seen from the above content that when the electricity leakage point is between the output of the solid state breaker and the input of the prosumer, the discharge of an internal capacitance of the Prosumer will be the discharge to the outside through a line where N1 and N2 are located (hereinafter referred to as a N line for short), so that the conventional solid state breaker cannot provide effective protection for the human body. In addition, although the conventional solid state breaker also provides a way to turn off the mechanical switch S1 on the N line to provide the protection for the human body, this way cannot provide satisfactory protection for the human body, especially in a high-voltage (750V) microgrid, since it takes a long time to turn off contact points of the mechanical switch.

With respect to the problems existing in the conventional solid state breaker, the present disclosure provides a new solid state breaker. The breaker provided by the present disclosure is provided with electronic switches at two poles (namely, the P line and the N line), so that it can provide effective protection for the human body and the like by quickly turning off the electronic switches provided at the two poles in the case of the electricity leakage of the prosumer to the ground, for example. The solid state breaker provided by the present disclosure can effectively solve the electricity leakage of the prosumer to the ground in the DC microgrid (for example, 750V microgrid), and has the advantages of bidirectional RCD protection and low cost.

Next, the solid state breaker provided by the present disclosure will be described in detail with reference to FIG. 2.

Figure 2:
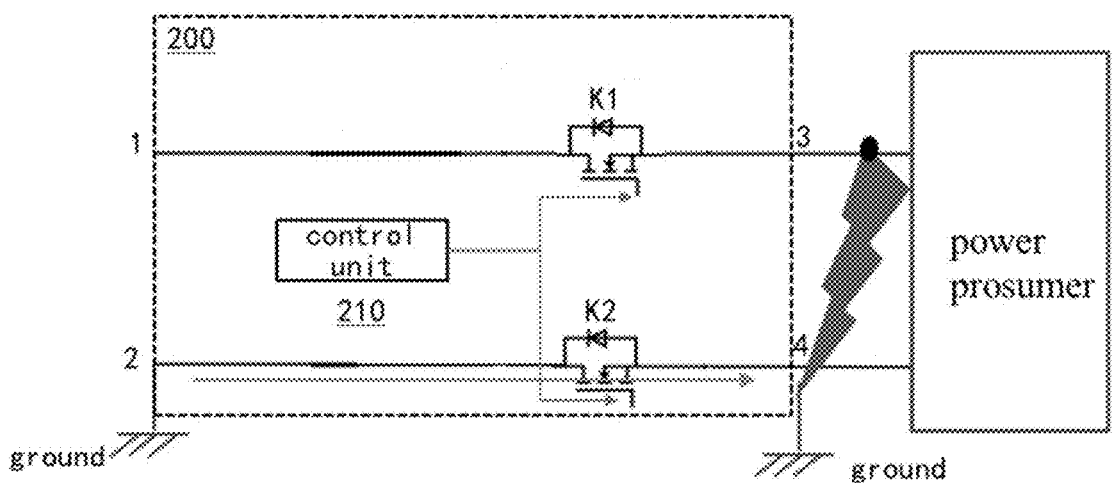
FIGS. 2-3 show a schematic diagram of a solid state breaker 200 according to an embodiment of the present disclosure.

FIG. 2 shows a schematic diagram of a solid state breaker 200 according to an embodiment of the present disclosure. As shown in FIGS. 2, the solid state breaker 200 may include a first port 1 and a second port 2 configured to connect a first external system; a third port 3 and a fourth port 4 configured to connect a second external system; a first electronic switch K1 connected between the first port 1 and the third port 3; a second electronic switch K2 connected between the second port 2 and the fourth port 4; and a control unit 210 configured to control the first electronic switch K1 and the second electronic switch K2 to be turned off in a case of detecting that an electricity leakage occurs in the second external system.

As an example, the first external system may include an external power supply, such as a 750V microgrid power supply.

As an example, the second external system may include a power prosumer system, such as a prosumer.

As an example, when the prosumer acts as a load and the first electronic switch K1 and the second electronic switch K2 are closed, when no electricity leakage occurs, the current from the external power supply will flow through the first port 1, the first electronic switch K1, the third port 3, the prosumer, the fourth port, the second electronic switch K2 and the second port 2 in turn and return to the external power supply, thus supplying power to the load. When the electricity leakage occurs, the current from the external power supply will flow through the first port 1, the first electronic switch K1, the third port 3, the electricity leakage point, a human body and the ground in turn and return to the external power supply, thus causing harm to the human body. In the above situation, the control unit 210 may control the first electronic switch K1 to turn off if it detects the occurrence of the above electricity leakage.

As another example, when the prosumer acts as a power supply and the first electronic switch K1 and the second electronic switch K2 are closed, when there is no electricity leakage, the current from the prosumer will flow through the third port 3, the first electronic switch K1, the first port 1, the external power supply, the second port 2, the second electronic switch K2 and the fourth port 4 in turn and return to the prosumer, thereby transmitting electric energy to the external power supply. When an electricity leakage occurs, the current from the prosumer will flow through the electricity leakage point, a human body, the ground, the second port 2, the second electronic switch K2 and the fourth port 4 in turn and return to the prosumer (as shown by the arrow in FIG. 2), thus causing the harm to the human body. In the above situation, the control unit 210 may control the second electronic switch K2 to turn off if it detects the occurrence of the above electricity leakage.

As a further example, when the prosumer acts as both a load and a power supply, such as acting as the load at a first time and acting as the power supply at a second time, the flow direction of current can be known by referring to the above two examples, and will not be repeated here. At this time, the control unit 210 may control the first electronic switch K1 and the second electronic switch K2 to turn off when it detects the occurrence of the above electricity leakage.

According to the embodiment of the present disclosure, the control unit 210 may detect whether there is an electricity leakage through the existing electricity leakage detection method. For example, it is detected by detecting a voltage difference between the third port 3 and the fourth port 4, by a DC leakage sensor based on fluxgate series, and so on.

According to an embodiment of the present disclosure, the first electronic switch K1 and/or the second electronic switch K2 may be an electronic switch based on a metal oxide semiconductor. For example, the first electronic switch K1 and/or the second electronic switch K2 may be an N-Metal-Oxide-Semiconductor, a P-Metal-Oxide-Semiconductor, an Insulate-Gate Bipolar Transistor (IGBT), and the like.

Figure 3:
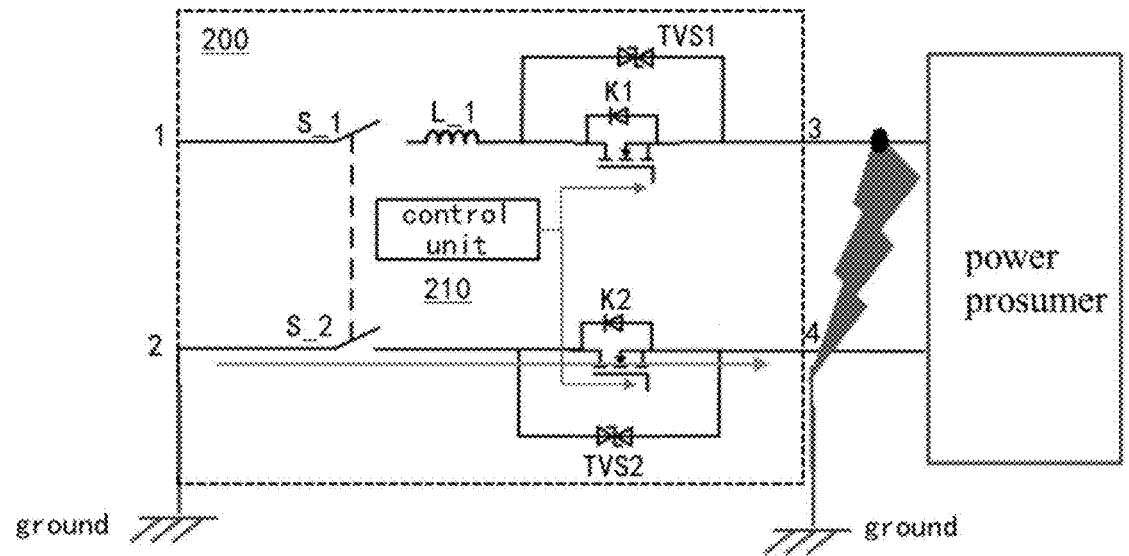

According to an embodiment of the present disclosure, the solid state breaker 200 provided by the present disclosure may further include a first voltage stabilizing unit connected in parallel with the first electronic switch, configured to stabilize a voltage of the first electronic switch within a predetermined range (e.g., within a rated voltage of the electronic switch). As an example, as shown in FIG. 3, the first voltage stabilizing unit is a first bidirectional voltage stabilizing diode TVS1, one end of the first bidirectional voltage stabilizing diode TVS1 being connected with a first end of the first electronic switch K1, and another end of the first bidirectional being connected with a second end of the first electronic switch K2.

According to an embodiment of the present disclosure, the solid state breaker 200 provided by the present disclosure may further include a second voltage stabilizing unit connected in parallel with the second electronic switch configured to stabilize a voltage of the second electronic switch within a predetermined range (e.g., within the rated voltage of the electronic switch). As an example, as shown in FIG. 3, the second voltage stabilizing unit may be a second bidirectional voltage stabilizing diode TVS2, one end of the second bidirectional voltage stabilizing diode TVS2 being connected with a first end of the second electronic switch K2, and another end of the second electronic switch K2 being connected with a second end of the second electronic switch K2.

The solid state breaker 200 provided by the present disclosure is provided with the first bidirectional voltage stabilizing diode TVS1 and the second bidirectional voltage stabilizing diode TVS2, so as to avoid the problems of false closing and damage and so on of the solid state breaker caused by excessive voltages of the first electronic switch K1 and the second electronic switch K2 due to some abnormal conditions.

According to an embodiment of the present disclosure, the solid state breaker 200 provided by the present disclosure may further include a current regulating unit connected between the first port and the first electronic switch, configured to making current variation of a current passing through the first electronic switch meet a predetermined condition. As an example, as shown in FIG. 3, the current regulating unit includes an inductor L_1, which is connected between the first port 1 and the first electronic switch K1 for making the current variation of the current passing through the first electronic switch K1 meet a predetermined condition. The predetermined condition may be an appropriate condition that can handle the current variation in time set based on an actual situation. The solid state breaker 200 provided by the present disclosure can avoid, by setting the inductor L_1, the occurrence that it is too late to deal with the electricity leakage situation due to the current variation being too fast.

According to an embodiment of the present disclosure, as shown in FIG. 3, the solid state breaker 200 provided by the present disclosure may further include a first mechanical switch S_1 connected between the first port 1 and the first electronic switch K1. The solid state breaker 200 provided by the present disclosure may further include a second mechanical switch S_2 connected between the second port 2 and the second electronic switch K2. As an example, the first mechanical switch S_1 and the second mechanical switch S_2 may be any suitable mechanical switch, such as a single-pole single-throw switch, a double-pole double-throw switch and the like. As an example, the first mechanical switch S_1 and the second mechanical switch S_2 may be set in linkage so as to be simultaneously opened or closed. The solid state breaker 200 provided by the present disclosure can facilitate the daily maintenance of the solid state breaker by providing the first mechanical switch S_1 and the second mechanical switch S_2.

The solid state breaker provided by the present disclosure has been described in detail above with reference to FIGS. 2 and 3. As can be seen from the above description, since the breaker provided by the present disclosure is provided with electronic switches at both poles, it can provide effective protection for a human body and the like by quickly turning off the electronic switches provided at the above both poles, in a case of the electricity leakage of the prosumer to the ground, for example. In addition, the solid state breaker provided by the present disclosure is provided with two bidirectional voltage stabilizing diodes to avoid problems such as false closing and damage of the solid state breaker caused by excessive voltage of the electronic switch due to some abnormal situations. In addition, the solid state breaker provided by the present disclosure can also avoid, by setting the inductor, the occurrence that it is too late to deal with the electricity leakage situation due to the current variation being too fast. Moreover, the solid state breaker provided by the present disclosure can also facilitate the daily maintenance of the solid state breaker by setting two mechanical switches.

The present disclosure provides a power supply system in addition to the solid state breaker described above in connection with FIGS. 2 and 3. The power supply system provided by the present disclosure may include the solid state breaker 200 as described above in connection with FIGS. 2 and 3; the power supply connected, as the first external system, with the first port 1 and the second port 2 of the solid state breaker; and a power prosumer system connected, as the second external system, with the third port 3 and the fourth port 4 of the solid state breaker, the power prosumer system having power consumption capacity and power generation capacity.

As an example, the power supply may be the above-mentioned 750V microgrid power supply.

As an example, the power prosumer system may be the prosumer described above.

The block diagrams of circuits, units, means, apparatuses, devices and systems involved in the present disclosure are only illustrative examples, and are not intended to require or imply that they must be connected, arranged and configured in the manner shown in the block diagram. As those skilled in the art will recognize, these circuits, units, means, apparatuses, devices and systems can be connected, arranged and configured in any way, as long as the desired purpose can be achieved. The circuits, units, means and apparatuses involved in the utility model can be realized using any suitable way, such as using application specific integrated circuits and field programmable gate arrays (FPGAs), etc.

It should be understood by those skilled in the art that the above specific embodiments are only examples, not limitations, and various modifications, combinations, partial combinations and substitutions can be made to the embodiments of the utility model according to design requirements and other factors, as long as they are within the scope of the appended claims or their equivalents, that is, they belong to the scope of the rights to be protected by the utility model.

The invention claimed is:

1. A solid state breaker, comprising:
a first port and a second port configured to connect a first external system;
a third port and a fourth port configured to connect a second external system configured to both consume and supply power;
a first electronic switch connected between the first port and the third port;
a second electronic switch connected between the second port and the fourth port; and
a control unit configured to:
detect an electricity leakage in the second external system by detecting a voltage difference between the third port and the fourth port; and
control the first electronic switch and the second electronic switch to be turned off upon detecting the electricity leakage in the second external system.

2. The solid state breaker according to claim 1, further comprising:
a first voltage stabilizing unit connected in parallel with the first electronic switch, wherein the first voltage stabilizing unit is configured to stabilize a first voltage of the first electronic switch within a first predetermined range.

3. The solid state breaker according to claim 2, wherein the first voltage stabilizing unit is a first bidirectional voltage stabilizing diode, wherein one end of the first bidirectional voltage stabilizing diode is connected with a first end of the first electronic switch, and wherein another end of the first bidirectional voltage stabilizing diode is connected with a second end of the first electronic switch.

4. The solid state breaker according to claim 3, further comprising:
a second voltage stabilizing unit connected in parallel with the second electronic switch, wherein the second voltage stabilizing unit is configured to stabilize a second voltage of the second electronic switch within a second predetermined range.

5. The solid state breaker according to claim 4, wherein the second voltage stabilizing unit is a second bidirectional voltage stabilizing diode, wherein one end of the second bidirectional voltage stabilizing diode is connected with a first end of the second electronic switch, and wherein another end of the second bidirectional voltage stabilizing diode is connected with a second end of the second electronic switch.

6. The solid state breaker according to claim 1, further comprising:
a current regulating unit connected between the first port and the first electronic switch, wherein the current regulating unit is configured for making current variation of a current passing through the first electronic switch meet a predetermined condition.

7. The solid state breaker according to claim 6, wherein the solid state breaker further comprises a first mechanical switch connected between the first port and the first electronic switch, and wherein the current regulating unit comprises an inductor connected between the first mechanical switch and the first electronic switch.

8. The solid state breaker according to claim 1, further comprising:
a first mechanical switch connected between the first port and the first electronic switch, wherein the first mechanical switch is connected in series with the first electronic switch; and
a second mechanical switch connected between the second port and the second electronic switch, wherein the second mechanical switch is connected in series with the second electronic switch.

9. The solid state breaker according to claim 8, wherein the second mechanical switch is set in linkage with the first mechanical switch such the first and second mechanical switches simultaneously open or close.

10. The solid state breaker according to claim 1, wherein the first electronic switch and/or the second electronic switch is an electronic switch based on a metal oxide semiconductor, and wherein the first external system comprises a microgrid.

11. A power supply system comprising:
a solid state breaker, comprising:
a first port and a second port configured to connect a first external system;
a third port and a fourth port configured to connect a second external system;
a first electronic switch connected between the first port and the third port;
a second electronic switch connected between the second port and the fourth port; and
a control unit configured to detect an electricity leakage in the second external system by detecting a voltage difference between the third port and the fourth port, wherein the control unit is further configured to control the first electronic switch and the second electronic switch to be turned off upon detecting the electricity leakage in the second external system;
a power supply connected, as the first external system, with the first port and the second port of the solid state breaker; and
a power prosumer system connected, as the second external system, with the third port and the fourth port of the solid state breaker, the power prosumer system having power consumption capacity and power generation capacity.

12. The power supply system according to claim 11, wherein the solid state breaker further comprises a first voltage stabilizing unit connected in parallel with the first electronic switch, and wherein the first voltage stabilizing unit is configured to stabilize a voltage of the first electronic switch within a predetermined range.

13. The power supply system according to claim 12, wherein the first voltage stabilizing unit is a first bidirectional voltage stabilizing diode, wherein one end of the first bidirectional voltage stabilizing diode is connected with a first end of the first electronic switch, and wherein another end of the first bidirectional voltage stabilizing diode is connected with a second end of the first electronic switch.

14. The power supply system according to claim 11, wherein the solid state breaker further comprises a second voltage stabilizing unit connected in parallel with the second electronic switch, and wherein the second voltage stabilizing unit is configured to stabilize a voltage of the second electronic switch within a predetermined range.

15. The power supply system according to claim 14, wherein the second voltage stabilizing unit is a second bidirectional voltage stabilizing diode, wherein one end of the second bidirectional voltage stabilizing diode is connected with a first end of the second electronic switch, and wherein another end of the second bidirectional voltage stabilizing diode is connected with a second end of the second electronic switch.

16. The power supply system according to claim 11, wherein the solid state breaker further comprises a current regulating unit connected between the first port and the first electronic switch, and wherein the current regulating unit is configured for making current variation of a current passing through the first electronic switch meet a predetermined condition.

17. The power supply system according to claim 11, wherein the current regulating unit comprises an inductor connected in series with the first electronic switch.

18. The power supply system according to claim 11, wherein the solid state breaker further comprises:

a first mechanical switch connected between the first port and the first electronic switch, wherein the first mechanical switch is connected in series the first electronic switch; and a second mechanical switch connected between the second port and the second electronic switch, wherein the second mechanical switch is connected in series with the second electronic switch.

19. The power supply system according to claim 18, wherein the control unit is disposed between a first pair of mechanical switches and a second pair of electronic switches, wherein the first pair includes the first and second mechanical switches, and wherein the second pair includes the first and second electronic switches.

20. The power supply system according to claim 11, wherein the power supply comprises a 750-volt microgrid power supply.

* * * * *